United States Patent
Yosefin

(10) Patent No.: US 7,911,518 B2
(45) Date of Patent: Mar. 22, 2011

(54) VARIABLE EXPOSURE FOR COLOR IMAGE SENSOR

(75) Inventor: Mark Yosefin, Jerusalem (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 699 days.

(21) Appl. No.: 11/345,637

(22) Filed: Jan. 31, 2006

(65) Prior Publication Data

US 2006/0192867 A1    Aug. 31, 2006

Related U.S. Application Data

(60) Provisional application No. 60/649,282, filed on Feb. 1, 2005.

(51) Int. Cl.
*H04N 5/335* (2006.01)

(52) U.S. Cl. ........ 348/273; 348/272; 348/266; 348/281; 348/294; 348/297; 348/302; 348/308

(58) Field of Classification Search .................... 348/273
See application file for complete search history.

(56) References Cited

U.S. PATENT DOCUMENTS

| | | | |
|---|---|---|---|
| 3,971,065 A * | 7/1976 | Bayer | 348/276 |
| 5,247,366 A * | 9/1993 | Ginosar et al. | 348/256 |
| 5,737,098 A * | 4/1998 | Sayag | 358/483 |
| 6,518,558 B1 * | 2/2003 | Bohm et al. | 250/208.1 |
| 2002/0180875 A1 * | 12/2002 | Guidash | 348/280 |
| 2005/0128327 A1 * | 6/2005 | Bencuya et al. | 348/308 |
| 2005/0167574 A1 * | 8/2005 | He et al. | 250/214 R |
| 2006/0145203 A1 * | 7/2006 | Toros et al. | 257/291 |

* cited by examiner

*Primary Examiner* — David L Ometz
*Assistant Examiner* — Angel L Garces-Rivera
(74) *Attorney, Agent, or Firm* — Harness, Dickey & Pierce, P.L.C.

(57) ABSTRACT

A method of capturing an image of a scene using an image capture device having an array of pixels, wherein the array of pixels includes pixels of different colors, includes, for a first duration, capturing a first portion of the scene with a first plurality of the pixels of a first color, and for a second duration, capturing a second portion of the scene with a second plurality of the pixels of a second color. The first and second durations are different and the first and second durations are chosen, at least in part, to improve the signal to noise ratio of the image capture device.

20 Claims, 16 Drawing Sheets

VARIABLE EXPOSURE FOR COLOR IMAGE SENSOR

CROSS-REFERENCES TO RELATED APPLICATIONS

This application is a non-provisional of, and claims the benefit of, co-pending, commonly-assigned, U.S. Provisional Patent Application No. 60/649,282 entitled "VARIABLE EXPOSURE FOR COLOR IMAGER," filed on Feb. 1, 2006, by Yosefin and of U.S. Provisional Patent Application No. 60/649,337 entitled "DUAL EXPOSURE FOR IMAGE SENSOR," filed on Feb. 1, 2006, by Yaffee, the entire disclosure of each of which is herein incorporated for all purposes.

This application is related to co-pending, commonly-assigned, and currently filed U.S. patent Application No. 11/345,642 entitled "DUAL EXPOSURE FOR IMAGE SENSOR," the entire disclosure of which is herein incorporated for all purposes.

BACKGROUND OF THE INVENTION

Embodiments of the invention relate generally to image sensors. More specifically, embodiments of the invention relate to increasing the signal to noise ratio (SNR) of image sensors using variable exposure techniques.

Selecting the proper exposure duration for image sensors, such as CMOS image sensors (CIS), can be difficult. If the selected exposure duration is too long, pixels may become saturated and the resulting image quality may be poor. If the selected exposure duration is too short, pixels values may be below the dynamic threshold and detail may be lost.

U.S. Pat. No. 5,144,442 (the '442 patent) discloses a method to increase the dynamic range of still images (and of video streams) by acquiring the same scene with multiple exposure periods, then merging the multiple images into a single wide dynamic range image. Conventional techniques to obtain multiple images of the same scene include: using multiple image sensors; and using two sequential image acquisitions, one with a long exposure and one with a short exposure. The first method is expensive, not only because of the need for two image sensors, but also because the two image sensors need to be optically aligned with great precision so that the image of any object in front of the lens will be projected on the same pixel row and column of both image sensors. The second method, using sequential image acquisitions, is cheaper. Because the two acquisitions are not done at the same time, however, the resulting image is susceptible to motion artifacts. Other conventional techniques (e.g. U.S. Pat. No. 5,959,696) offer means to correct for such motion artifacts, but those methods are complex and expensive.

In view of the foregoing, improved methods are needed to increase the dynamic range of image sensors.

BRIEF SUMMARY OF THE INVENTION

Embodiments of the invention provide a method of capturing an image of a scene using an image capture device having an array of pixels. The array of pixels includes pixels of different colors. The method includes, for a first duration, capturing a first portion of the scene with a first plurality of the pixels of a first color, and for a second duration, capturing a second portion of the scene with a second plurality of the pixels of a second color. The first and second durations are different and the first and second durations are chosen, at least in part, to improve the signal to noise ratio of the image capture device.

In some embodiments the method includes, for a third duration, capturing a third portion of the scene with a third plurality of the pixels of a third color. The first, second, and third colors may be red, green, and blue. The first, second, and third durations may be different. The array of pixels may be a Bayer grid. The image capture device may be a CMOS image sensor. The first color may be red, the second color may be green, and the third color may be blue and two of the three durations may be the same.

In other embodiments, an image capture device, includes an array of pixels having pixels of different colors and circuitry configured to control the operation of the pixels to thereby capture an image of a scene. In doing so, the control circuitry causes the pixels to, for a first duration, capture a first portion of the scene with a first plurality of the pixels of a first color and, for a second duration, capture a second portion of the scene with a second plurality of the pixels of a second color.

In some embodiments, the first and second durations are different. The circuitry may be further configured to control the operation of the pixels to thereby capture an image of a scene by, for a third duration, capture a third portion of the scene with a third plurality of the pixels of a third color. The first, second, and third colors may be red, green, and blue. The first, second, and third durations may be different. The array of pixels may be a Bayer grid. The image capture device may be a CMOS image sensor. The first color may be red, the second color may be green, and the third color may be blue, and two of the three durations may be the same. The first, second, and third durations may be chosen, at least in part, to improve the signal to noise ratio of the image capture device In still other embodiments, an image capture device includes an array of pixels having pixels of different colors and circuitry configured to control the operation of the pixels to thereby capture an image of a scene. The circuitry includes means for capturing a first portion of the scene for a first duration with a first plurality of the pixels of a first color, means for capturing a second portion of the scene for a second duration with a second plurality of the pixels of a second color, means for capturing a third portion of the scene for a third duration with a third plurality of the pixels of a third color. The first and second durations are different.

In some embodiments the first, second, and third colors are red, green, and blue. The first, second, and third durations may be different. The array of pixels may be a Bayer grid. The image capture device may be a CMOS image sensor. The first color may be red, the second color may be green, and the third color may be blue and two of the three durations may be the same.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
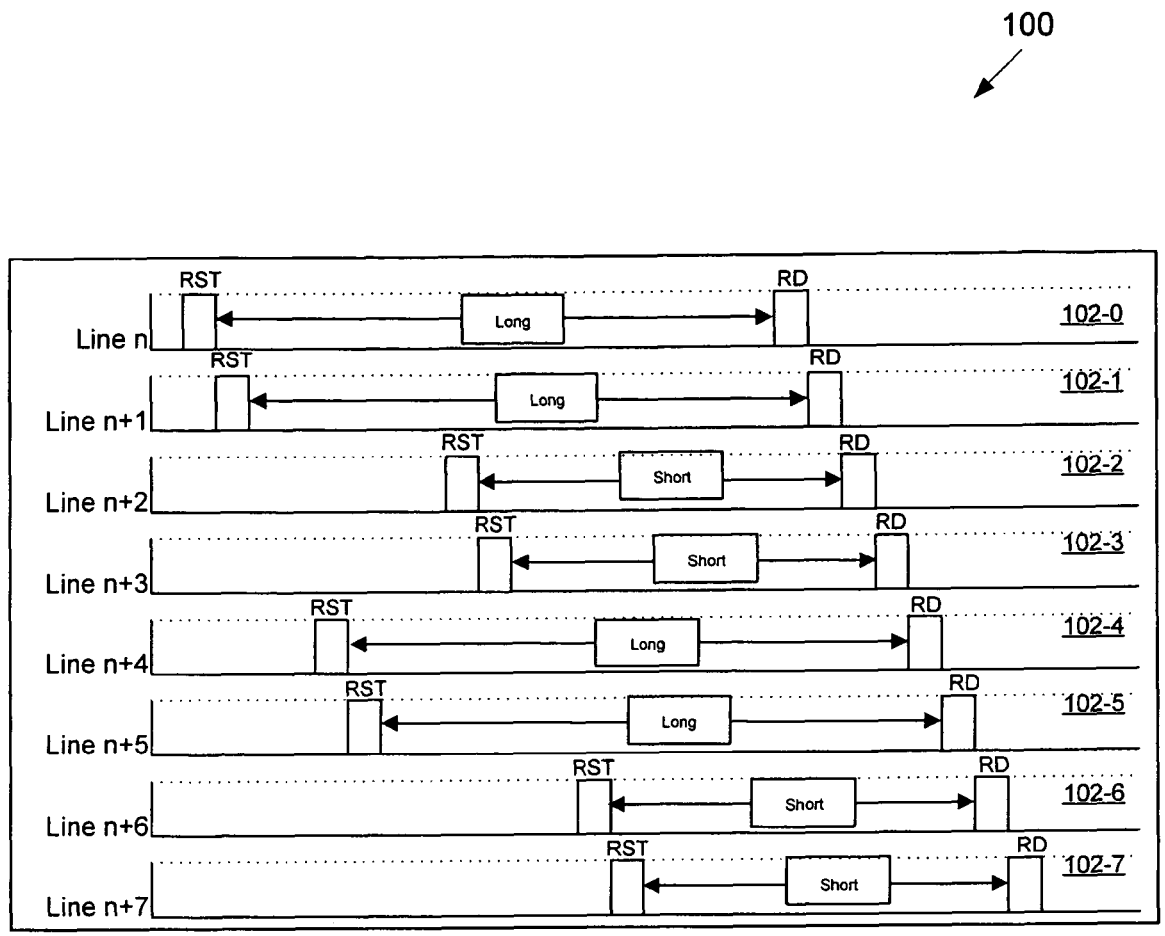
FIG. 1 illustrates timing waveforms a dual exposure image capture device according to embodiments of the invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. It will be understood by one of ordinary skill in the art, however, that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In the ensuing embodiments, methods and circuits to improve the dynamic range of image sensors are disclosed and claimed. Such embodiments reduce the signal to noise ratio (SNR) and/or prevent saturation of CMOS image sensors (CIS). Disclosed embodiments do not require multiple image sensors and do not require capturing multiple images at different times. In some embodiments, alternating short and long exposure durations are applied for every other row for an image array. In other embodiments, alternating short and long exposure durations are applied for every other row pair. In still other embodiments, different exposure durations are used for different colors and/or different color groups. Exemplary circuits to provide the timing waveforms to implement some embodiments are disclosed and claimed. An exemplary algorithm to merge information from alternating exposure pairs of rows to a seamless wide dynamic range picture or video stream is also disclosed.

A CIS-based camera typically adjusts the exposure level based on the brightness of the image to be captured. If the exposure is too long, some of the pixels—in particular those in the brighter areas of the image—tend to reach saturation—a point where they can no longer integrate light energy. Image regions with such over-exposed pixels are referred to as saturated regions, and pictures with large saturated regions are considered to be of low quality. On the other hand, when the exposure time is too short, the energy accumulated in some of the pixels—in particular those in the darker areas of the image—will be low relative to the energy of the inherent noise, resulting in poor SNR and, again, poor image quality.

Real-time software programs are used with CIS-based cameras. This software measures the energy levels of the pixels, extracts basic statistics from the measurement results, and then changes the exposure time accordingly so as to achieve an optimum picture. The software ideally converges to an exposure duration that is long enough so that a minimal number of pixels in dark area will exhibit poor SNR, but is short enough so that few—if any—pixels will be in saturation. Such real time software programs are generally referred to as "Auto-Exposure" functions.

Dual Exposure Embodiments

In the immediately ensuing embodiments, exposure durations are different for different rows. In some embodiments, the exposure durations are alternated between short and long after every pair of rows. Such embodiments are particularly useful for image arrays that employ Bayer grids. The color pattern of the pixels in a Bayer grid has a repetition period of two rows. Using different exposures for all odd rows on one hand and all even rows on the other hand may result in the loss of color information. Hence, in some embodiments with a Bayer grid, exposure durations are alternated every two rows.

FIG. 1 illustrates a timing diagram 100 for the top eight rows 102 of a CMOS image sensor (CIS) according to embodiments of the current invention. In this timing diagram, rows n (102-0), n+1 (102-1), n+4 (102-4), n+5 (102-5), . . . have a long exposure setting, while rows n+2 (102-2), n+3 (102-3), n+6 (102-6), n+7 (102-7) . . . have a short exposure setting. For each row, the exposure period is the period of time from the moment the row is Reset (RST) to the moment that the row is Read (RD).

The ratio of long exposure duration to short exposure duration need not be a whole number. The short exposure duration may be any fraction of the long exposure duration and may be optimized for different environments. The ratio may be user selectable or may be determined automatically.

Those skilled in the art will appreciate that the timing diagram of FIG. 1 corresponds to a "rolling shutter" image capture system. Those skilled in the art will also appreciate that other embodiments may be employed for use with "global shutter," or "snapshot shutter," systems wherein the exposure periods are initiated electronically (by resetting the short and long exposure rows at different times) and mechanically ending all the exposures at the same time. Rows are then read sequentially as shown and processed as will be described hereinafter.

Figure 2:
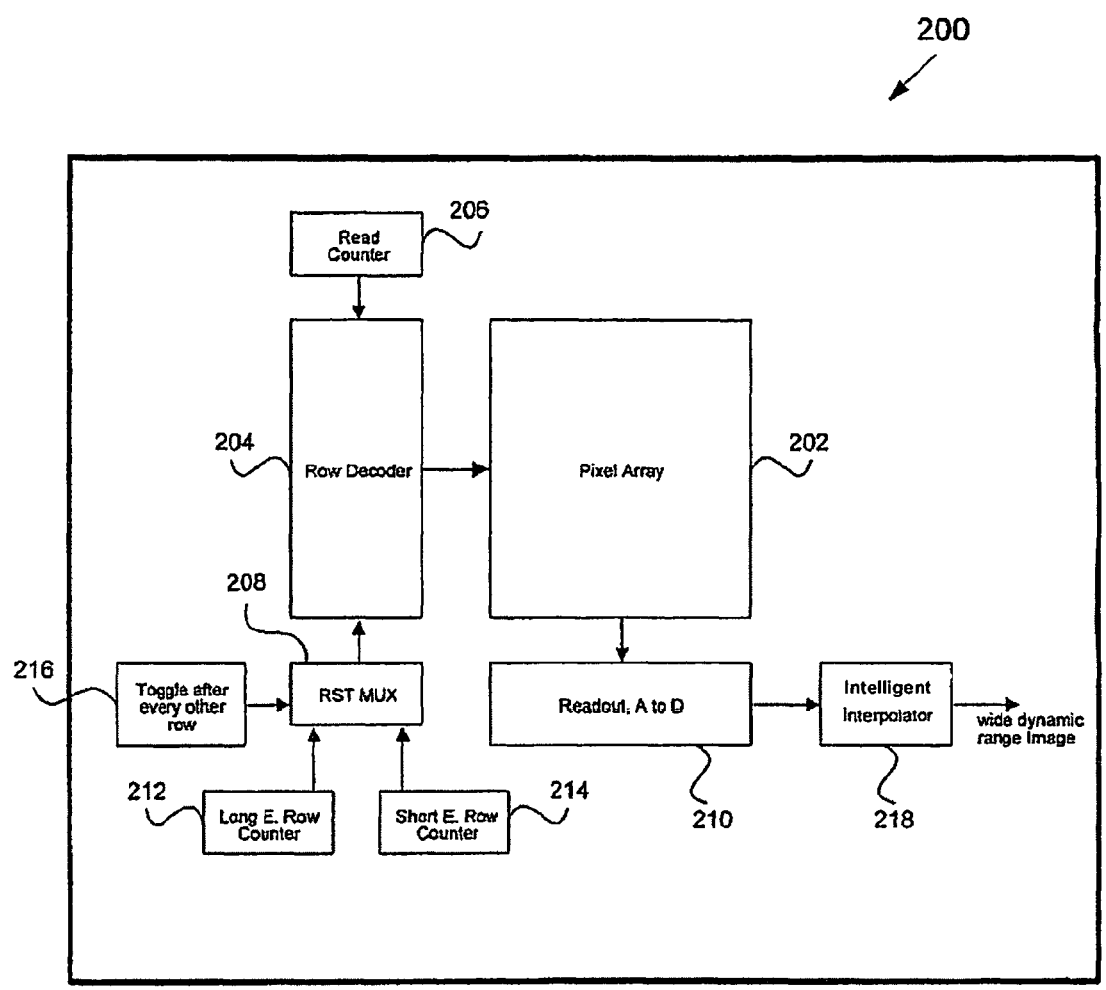
FIG. 2 illustrates a functional block diagram of a circuit to accomplish the dual exposure embodiment of FIG. 1.

Having described an exemplary timing diagram, attention is directed to FIG. 2, which illustrates an exemplary circuit 200 according to embodiments of the invention. The timing diagram of FIG. 1, in which alternating row pairs have different exposure durations, may be implemented in the circuit of FIG. 2.

The circuit 200 includes a pixel array 202, a row decoder 204, a read counter 206, a reset multiplexer 208, and a readout analog-to-digital converter 210. The pixel array 202 includes a number of CMOS sensors arranged into rows. The row decoder 204 addresses rows to be read in response to signals from the read counter 206 and reset multiplexer 208. The read counter 206 advances through the rows sequentially. The reset multiplexer 208 multiplexes logic signals from a long exposure counter 212, a short exposure counter 214, and a toggle circuit 216. Those skilled in the art will appreciate that the reset multiplexer 208 may be replaced with a reset counter to implement prior art algorithms.

The long exposure counter 212 advances the address of the row to be reset for those rows which are to have long exposure. The short exposure counter 214 advances the address of the row to be reset for those rows which are to have short exposure. The toggle circuit 216 toggles the reset multiplexer 208 between the long exposure counter 212 and the short exposure counter 214 every two rows.

The readout analog-to-digital converter 210 reads the voltages of CMOS sensors in the addressed row, optionally subtracts the pre-sampled Reset level and/or the Black Level, and coverts the output to digital form. The digital output is then fed into an intelligent interpolator 218 that combines the short and long exposure rows to form a wide-dynamic range image. The function of the intelligent interpolator 218 is described immediately hereinafter.

Figure 3:
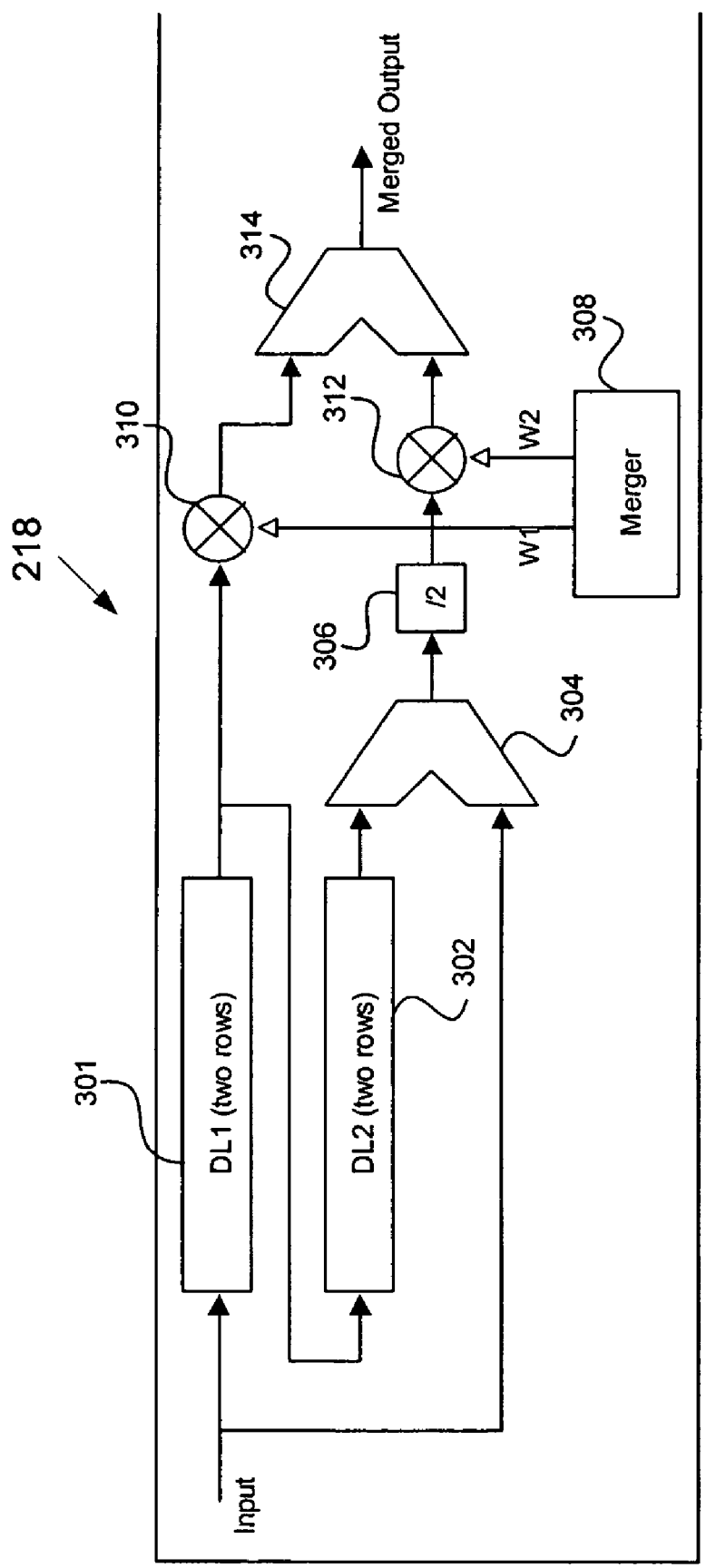
FIG. 3 illustrates a functional block diagram of the intelligent interpolator of FIG. 2.

FIG. 3 depicts the operation of the intelligent interpolator 218 logically. It includes two, two-row buffers DL1 (301) and DL2 (302). Rows are read serially into DL1, then through to DL2. Those skilled in the art will appreciate that the interpolator operates on one pixel at a time. If the "current row" is defined to be the row being output from DL1, the interpolation functions as follows.

As each pixel value is clocked out of DL2, it value is added to the value of the pixel being clocked from the A-to-D converter by the adder 304. The result is divided by 2 by the divider 306 to produce an average value. This operation creates an interpolated pixel value using the values of the pixels in the rows two above and two below the current row. This interpolated row is herein referred to as a "neighborhood row." A selection is then made between the current pixel of the neighborhood row and the current pixel of the current row that is being output from DL1. It should be apparent that the exposure duration of the current row will always be different than the exposure duration of the neighborhood row. When the exposure duration of the current row is short, the neighborhood row exposure duration will be long, and vice versa.

If the current row is a short exposure row and the current pixel value is above a predetermined threshold (i.e., above the noise level), then interpolation is not needed. The merger block 308 sets the value of W1 to be α (alpha) and sets the value of W2 to be 0, wherein α (alpha) is a scale factor. As a result, the output of the first multiplier 310 is the value of the current pixel of the current row multiplied by the scale factor and the output of the second multiplier 312 is 0. The values are summed by the adder 314, which outputs the high dynamic range output.

The scale factor α (alpha) is the ratio of the long exposure duration to the short exposure duration. For example, if the long exposure duration is 100 ms and the short exposure duration is 50 ms, then the scale factor is 2. Hence, when the exposure duration of the current row is short and the current pixel value is above the dynamic threshold, thus not requiring interpolation, the pixel value of the current row is used, but the value is scaled up to be on par with the long exposure duration rows.

If the current row is a short exposure row and the current pixel value is below the predetermined threshold, then interpolation is needed. The merger block 308 sets the value of W1 to be 0 and sets the value of W2 to be 1. The high dynamic range output for the current pixel then becomes the neighborhood row pixel value.

When the current row is a long exposure duration row and the current pixel value is not saturated, then interpolation is not needed. The merger block 308 sets W1 to be 1 and sets W2 to be 0. The high dynamic range output for the current pixel then remains the current pixel value.

If the current row is a long exposure duration row and the current pixel value is saturated, then interpolation is needed. The merger block 308 sets W1 to be 0 and sets W2 to be α The high dynamic range output becomes the value of the neighborhood row pixel, which is a short duration value, scaled up by the scale factor.

A nearly identical interpolator may be used to implement systems wherein the exposure duration is alternated every other row, rather than every two rows. The row buffers DL1 and DL2 need only be shortened to buffer one row at a time. Those skilled in the art will appreciate that similar interpolators may implement methods wherein exposure durations vary according to other patterns.

The foregoing embodiments change the exposure duration for various rows of an image sensing array. Other embodiments may change the exposure time for portions of rows or even individual pixels. Any number of exposure times could be used for a particular scan of the imaging array in various embodiments. Several such embodiments are described hereinafter.

Variable Exposure Durations Based on Pixel Color

In the immediately ensuing embodiments, methods and circuits to improve the signal to noise ratio (SNR) of color CMOS image sensors (CIS) are disclosed. In some embodiments, SNR improvement is achieved by adjusting the exposure time for each color component separately, avoiding the situation where, due to high energy level for one of the color components in the image, the exposure time to all color components is short, which could yield a low SNR. In other embodiments, two separate exposure controls are used, one for the Green color component and the other common for the Red and the Blue components. Any color grouping may be used in other embodiments.

Typical CIS-based cameras use a color filter array (CFA). Under normal lighting conditions, the energy response is not symmetrical with respect to the CFA colors. Specifically, the Green component typically has much more energy than the Red or the Blue components. As a result, Auto-Exposure software typically limits the exposure to the point where Green pixels reach saturation and, consequently, the Red and the Blue pixels have a relatively short exposure and exhibit poor SNR. This situation is illustrated for a typical image at FIG. 4.

Figure 4:
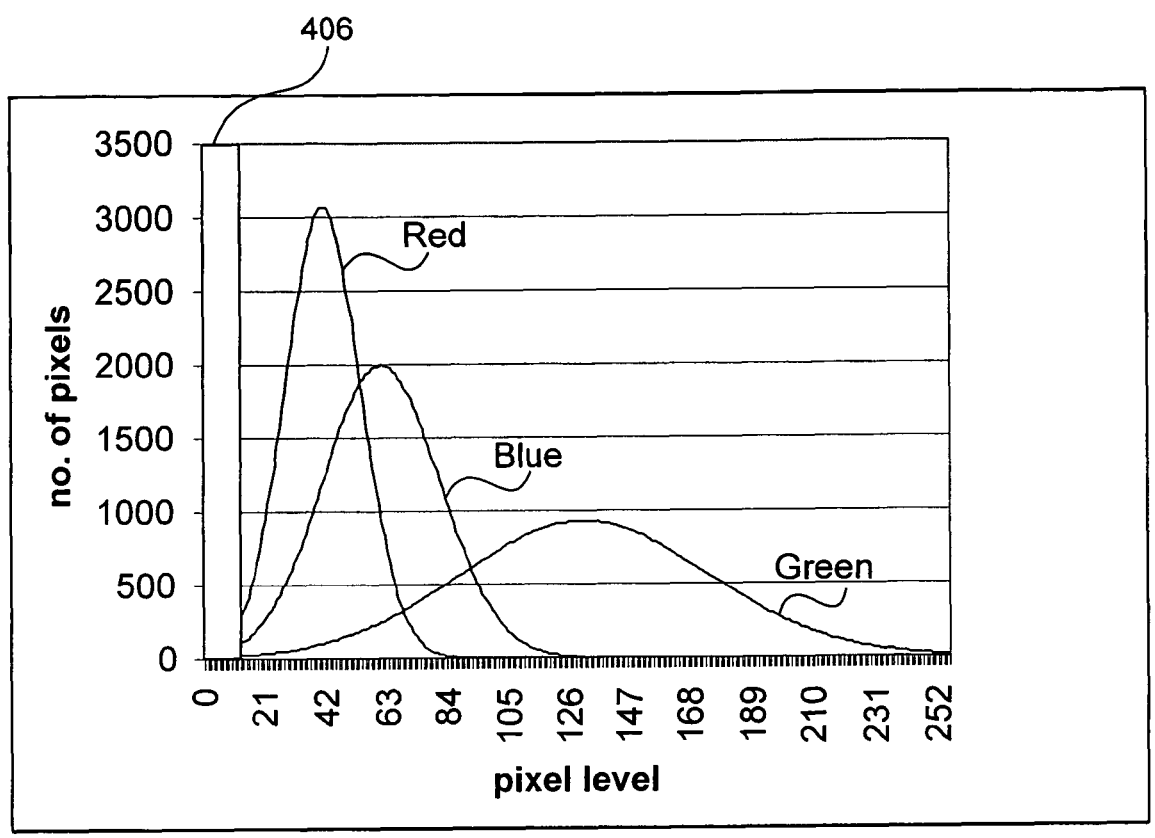
FIG. 4 illustrates an energy profile for an image captured by a conventional image capture device.

Referring to FIG. 4, suppose the relative strengths of the Green, Blue and Red components are normally distributed around the values of 130, 60 and 40 (out of 256 full scale levels), respectively. The exposure setting cannot be further increased since some of the Green pixels are close to or at 255—the saturation level. Suppose further that the RMS of the noise is 10 levels—designated by the region 406.

As can be seen with reference to FIG. 4, the SNR for the green pixels at the peak is 20*log(130/10)=22.3 dB. However, for the peak value of the blue pixels, which is around level 60, the SNR is 20*log(60/20)=15.6 dB, and for the peak value of the red pixels around level 40, the SNR is only 20*log(40/10)=12 dB.

Figure 5:
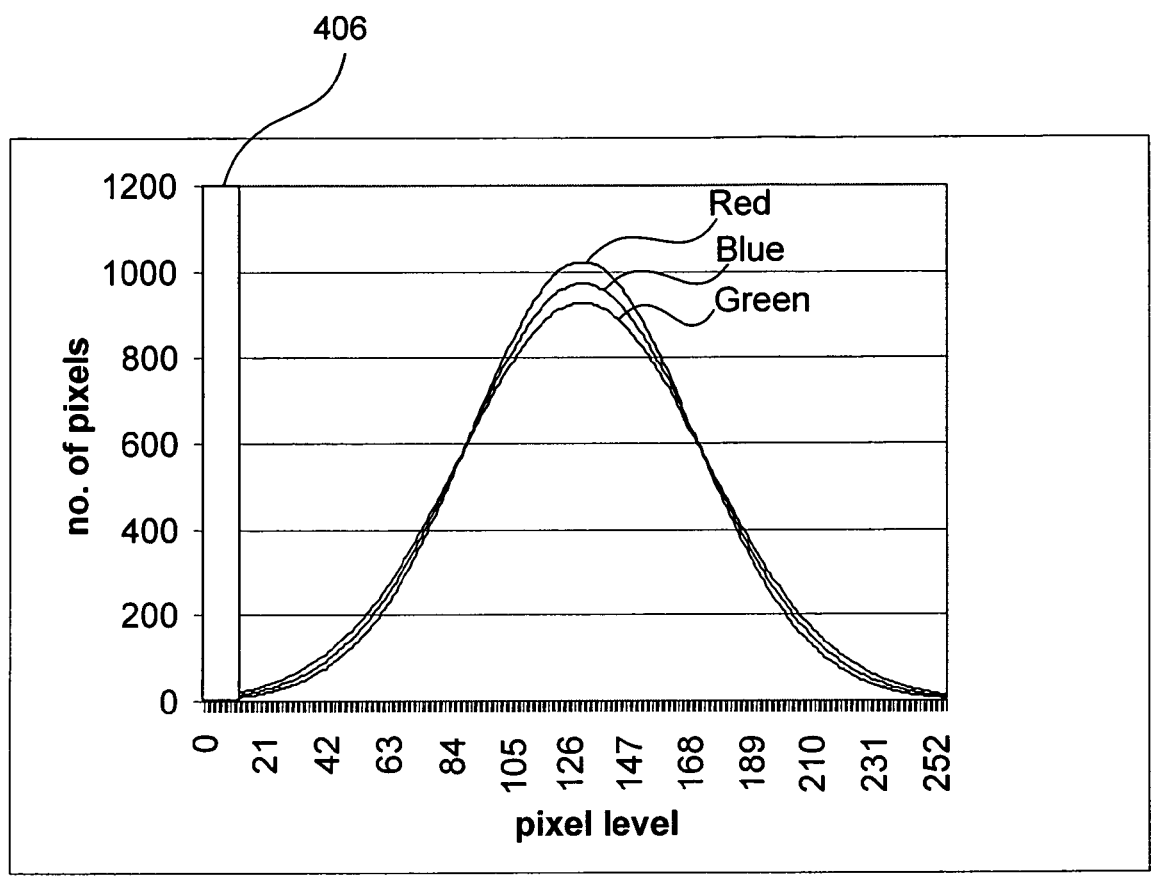
FIG. 5 illustrates an energy profile for an image captured by an image capture device according to embodiments of the invention.

A CIS built according to one embodiment of the present invention has different exposure times for one or more of the color components. For example, each color component in the CIS array could have a separate exposure time control. FIG. 5 illustrates the energy profile for such an embodiment.

Referring to FIG. 5, an energy profile is illustrated for a CIS embodiment that has different exposure times for each color component. According to this embodiment, the three color components have similar distributions. If this were the same captured image whose energy profile is depicted in FIG. 4, it is apparent that the Red and Blue exposure times have been increased so as to approach saturation. The SNR for the peak value of all three components is, therefore, about 22.3 dB, a significant improvement for both the Red and Blue components.

Figure 6:
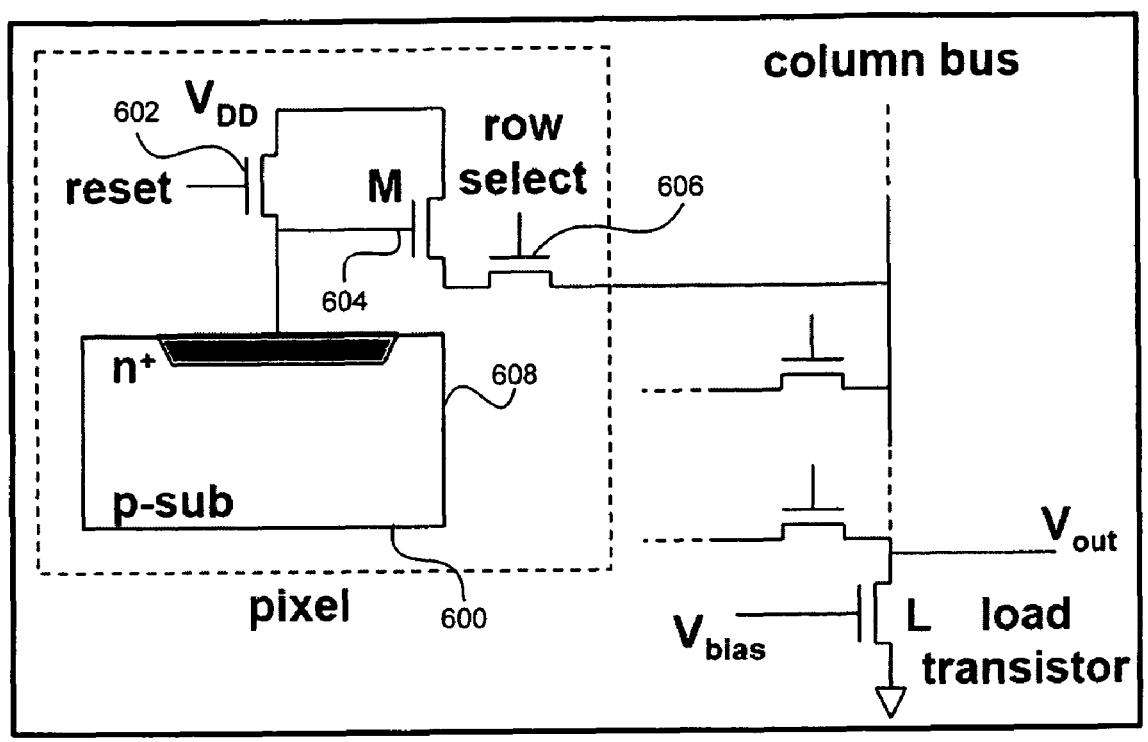
FIG. 6 illustrates an exemplary 3-T pixel circuit according to embodiments of the invention.

3- and 4-Transistor Pixel Active Pixel Sensor Embodiments with No Transistor Sharing FIG. 6 illustrates a first exemplary circuit for implementing an embodiment that results in the energy profile of FIG. 5. FIG. 6 illustrates a single, 3-transistor (3-T) pixel 600 having transistors 602, 604, and 606. The first transistor 602 receives a reset pulse, which begins charging of a photo-diode 608 (the n$^+$-p$^-$ junction) to an initial high level. Following release of the reset pulse, the photo-diode starts the exposure period, the period when the pixel integrates light energy. The integration ends when the voltage on the diode is read to the column bus, through the transistor 604, a source follower transistor, and through the transistor 606, a row select transistor.

Figure 7:
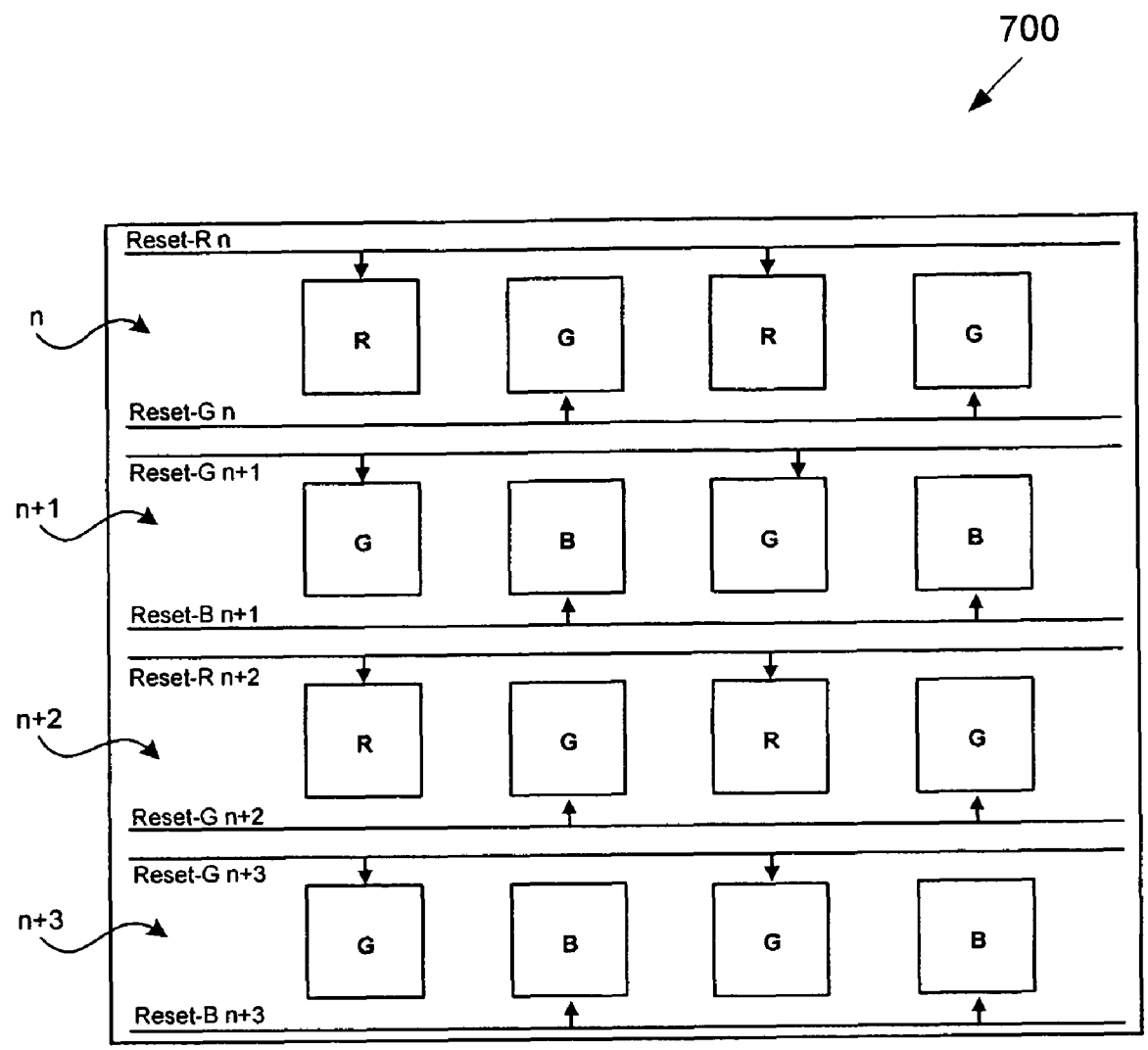
FIG. 7 illustrates an exemplary pixel array for use with the circuit of FIG. 6.

FIG. 7 illustrates a 4×4 portion of a pixel array using a Bayer Grid. This embodiment uses the circuit of FIG. 6, although other appropriate circuits may be used. The rows are identified starting with row n at the top and ending with row n+3 at the bottom (column numbers are not depicted). Reset inputs of the individual pixels are shown and are identified as "reset" followed by a letter indicating the color being reset for the row. Every color component in a row of pixels has a dedicated reset line to every pixel of that color in the row. Hence, each row requires two reset lines since each row has two different color pixels.

Figure 8:
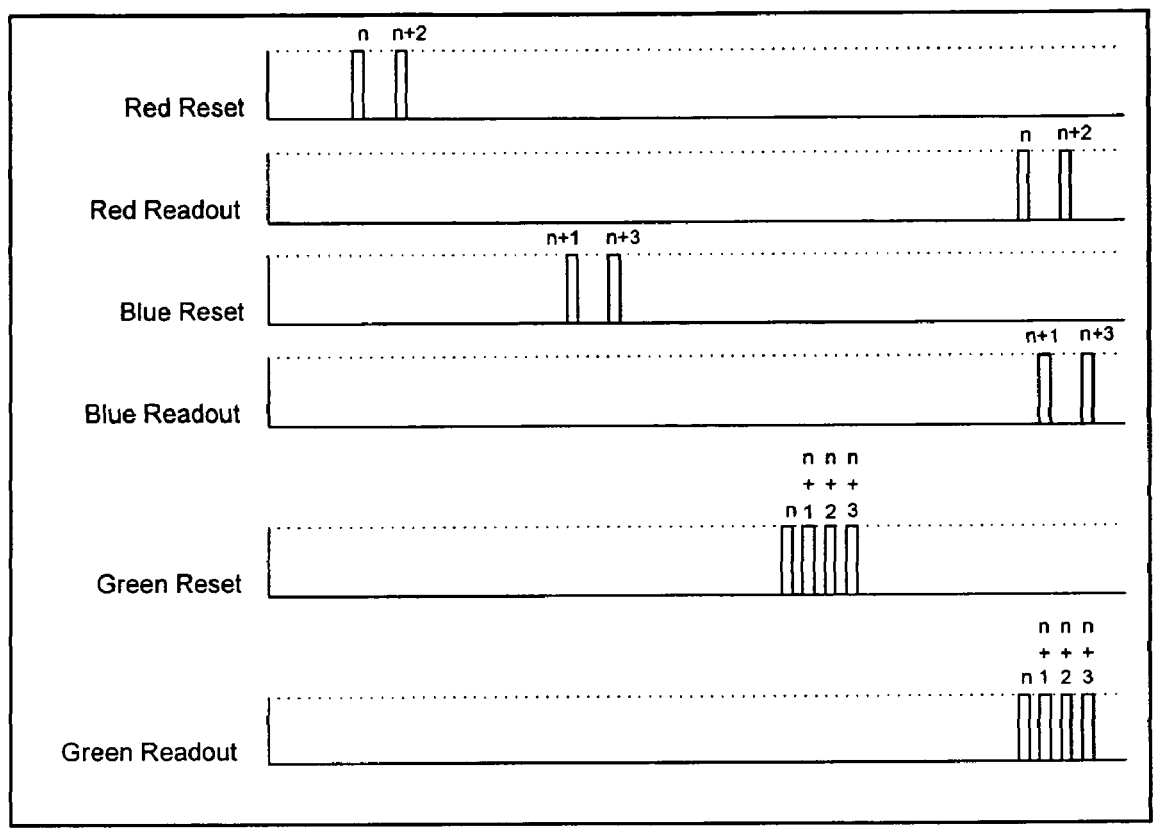
FIG. 8 illustrates timing waveforms for the pixel array of FIG. 7

FIG. 8 illustrates timing waveforms for the pixel array of FIG. 7. For each row, the exposure time begins when the reset turns low (inactive) for that row and lasts until the pixel is read out. According to this embodiment, readout of all color components is done sequentially by rows. The reset for each color component, however, has different time periods. Differing periods allow the exposure time for the Blue pixels of row n+1 or for row n+3 to be longer than the exposure time for Green pixels in rows n, n+1, n+2, n+3, but shorter than the exposure time for the Red pixels in rows n, n+2. In other words, each color component exposure time may be adjusted to optimize the quality of the captured image.

The split reset lines for each color employ additional logic in the row decoder of the imaging array. Rather than generating a single reset pulse for each row, a row decoder according to the present embodiment generates a separate reset pulse for each color of the row.

Figure 9:
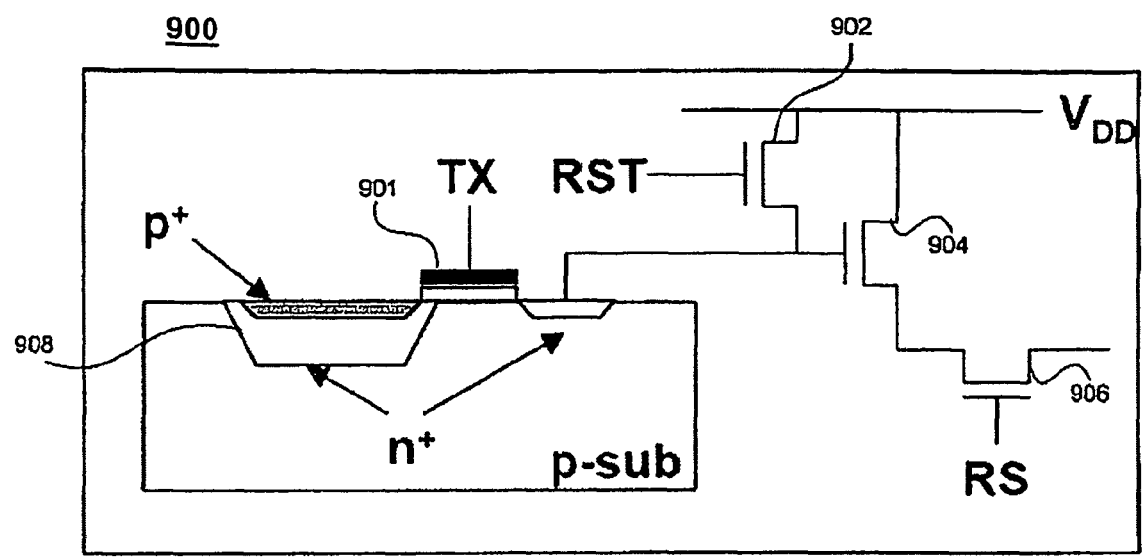
FIG. 9 illustrates an exemplary 4-T pixel circuit according to embodiments of the invention.

FIG. 9 depicts a 4-T pixel 900 according to embodiments of the invention. In this embodiment a fourth transistor 901 separates the photo-diode 908 from the reset transistor 902, the source follower transistor 904, and the row select transistor 906. With respect to the reset transistor 902, a difference between a 4-T and a 3-T pixel is that exposure start is achieved by a combination of a pulse on the gate of the reset transistor 902 concurrently with or a short time before a pulse on the transistor 901, which charges the photodiode to its initial voltage.

For a pixel array using a 4-T pixel such as the pixel 900, the arrangement is similar to that shown in FIG. 7 for a 3-T pixel, except that horizontal TX lines, in addition to the reset lines, are used.

The timing waveforms for a 4-T pixel array is similar to that shown in FIG. 8 for a 3-T pixel array. For such embodiments, TX lines are wired in parallel to the reset lines and have similar timing waveforms to achieve color-varying exposure.

4-T Active Pixel Sensor with Sharing of Pixels Between Two Pixels

Figure 10:
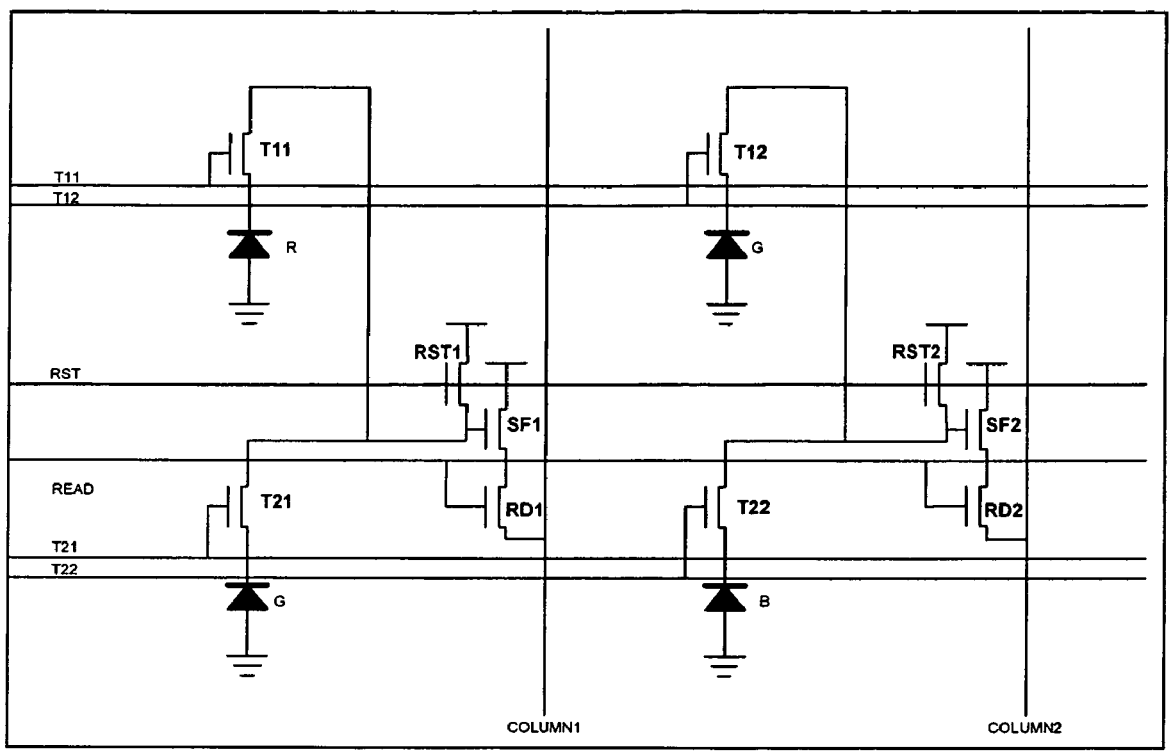
FIG. 10 illustrates an exemplary 2×2 array employing transistor sharing between two pixels according to embodiments of the invention.

In some embodiments of the present invention, some pixels share various elements. In the embodiment depicted in FIG. 10, the Reset (RST1, RST2), Source-Follower (SF1, SF2), and Read (RD1, RD2) transistors are shared between two vertically adjacent pixels. FIG. 10 depicts a 2×2 portion of a CIS array.

Figure 11:
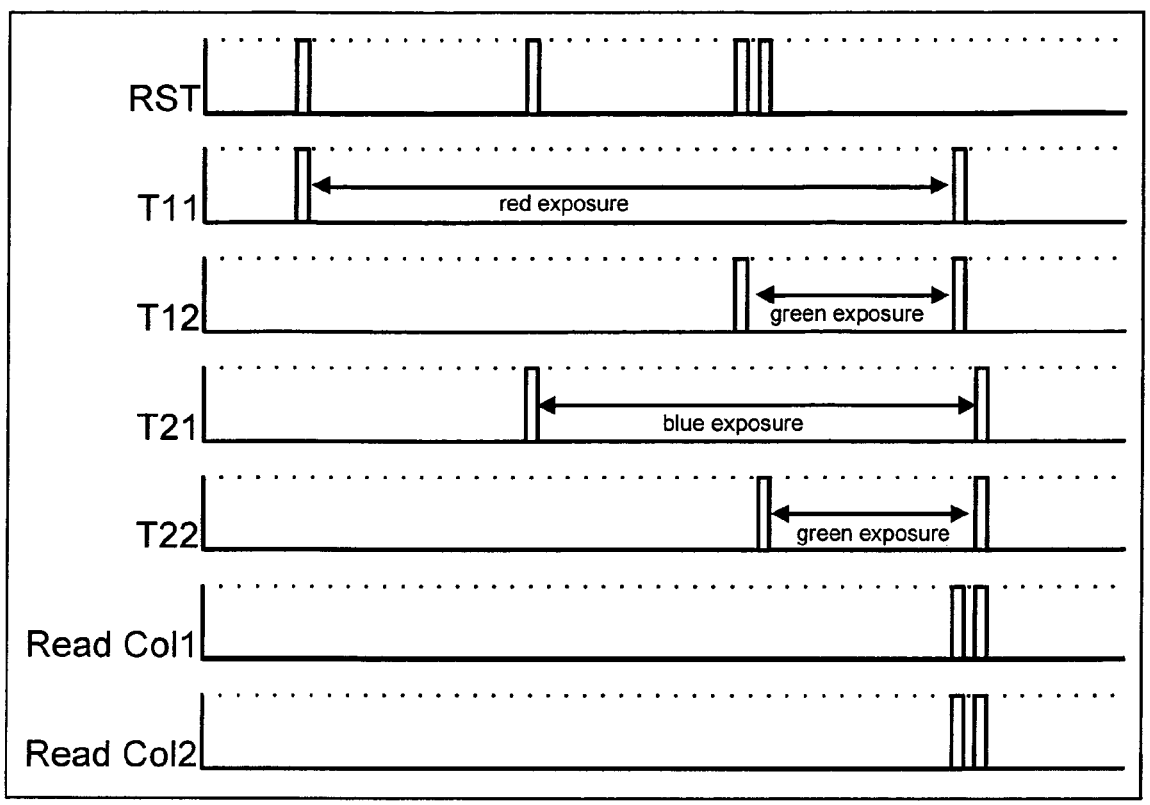
FIG. 11 illustrates timing waveforms for the pixel array of FIG. 10.

FIG. 11 illustrates timing waveforms for use with the circuit of FIG. 110. The use of such timing waveforms in combination with the circuit of FIG. 10 results in improved SNR since the exposure durations for each color may be determined independently. The timing of the RST and Txx pulses (wherein Txx is T11, T12, T21, and T22) are varied according to feedback from the auto-exposure software.

The RST line, which is common to all pixels of the two depicted rows of the array, is pulsed four times. The Txx lines of the four color components are pulsed separately, each concurrently with the corresponding RST pulse, thus starting the integration of one of the four pixels of the 4×4 pixel array with each pulse. For readout, the Txx lines are pulsed again, this time simultaneously with read pulses. As is apparent, columns 1 and 2 may be read simultaneously, although row two is read in a subsequent clock cycle from row 1, which is common for Rolling Shutter image capture, widely used with respect to CIS devices. Although not shown, extra reset pulses may be applied prior to readout to achieve correlated double sampling 4-T Active Pixel Sensor with Sharing of Transistors Between Four Pixels In another embodiment depicted in FIG. 12, the reset (RST), source-follower (SF) and read (RD) transistors are shared between four adjacent pixels in two neighbor rows and two neighbor columns. A 2×2 portion of the array for this embodiment is depicted. There are separate Transfer lines (Txx) for each of the color components and a single column line (COLUMN) for all four. Hence, each of the four pixel values must be read out during different clock periods. The timing for this embodiment is depicted in FIG. 13.

Integration for each pixel is initiated by simultaneous pulses on the RST and respective Txx lines. Read is done sequentially for the four pixels with simultaneous pulses on the READ and respective Txx lines. This achieves different exposure times for each of the color components by having the timing of the RST pulses being determined by Auto-Exposure software or a user input.

Figure 12:
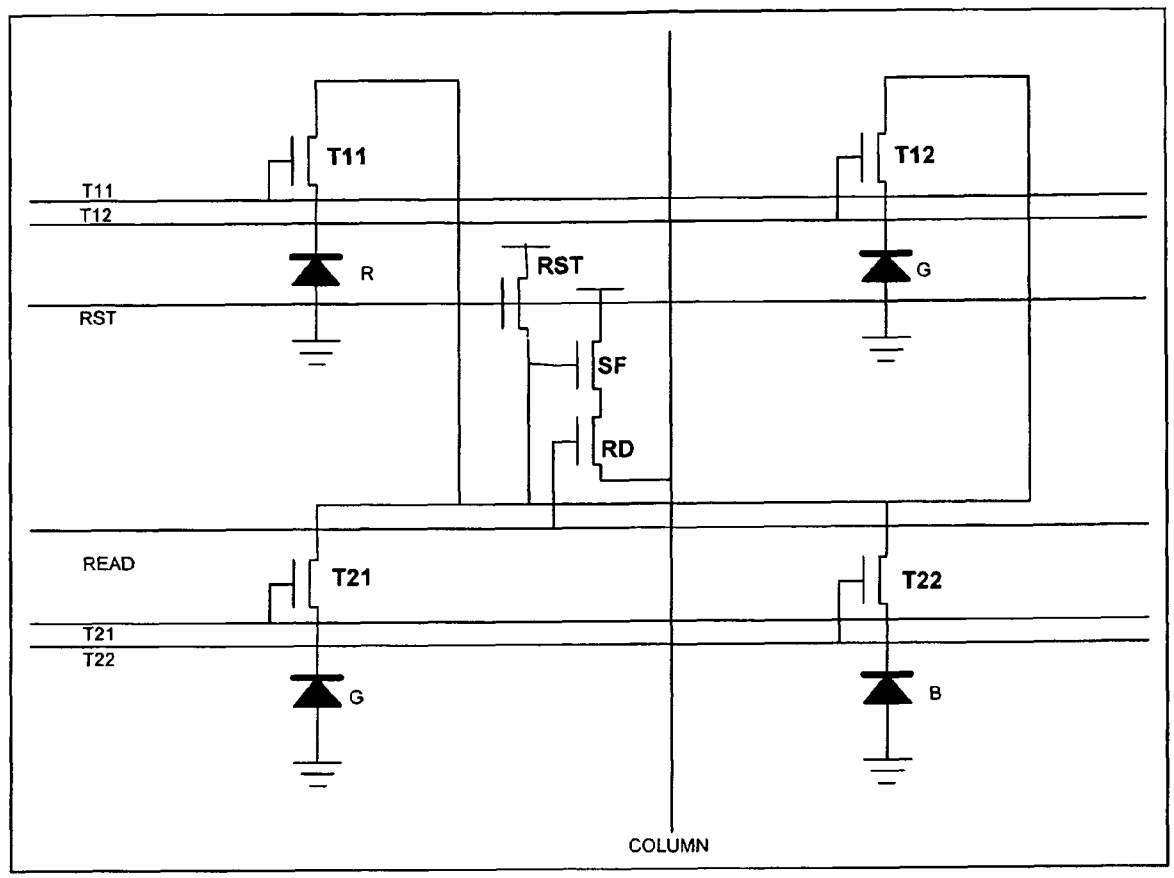
FIG. 12 illustrates an exemplary 2×2 array employing transistor sharing among four pixels according to embodiments of the invention.
Figure 13:
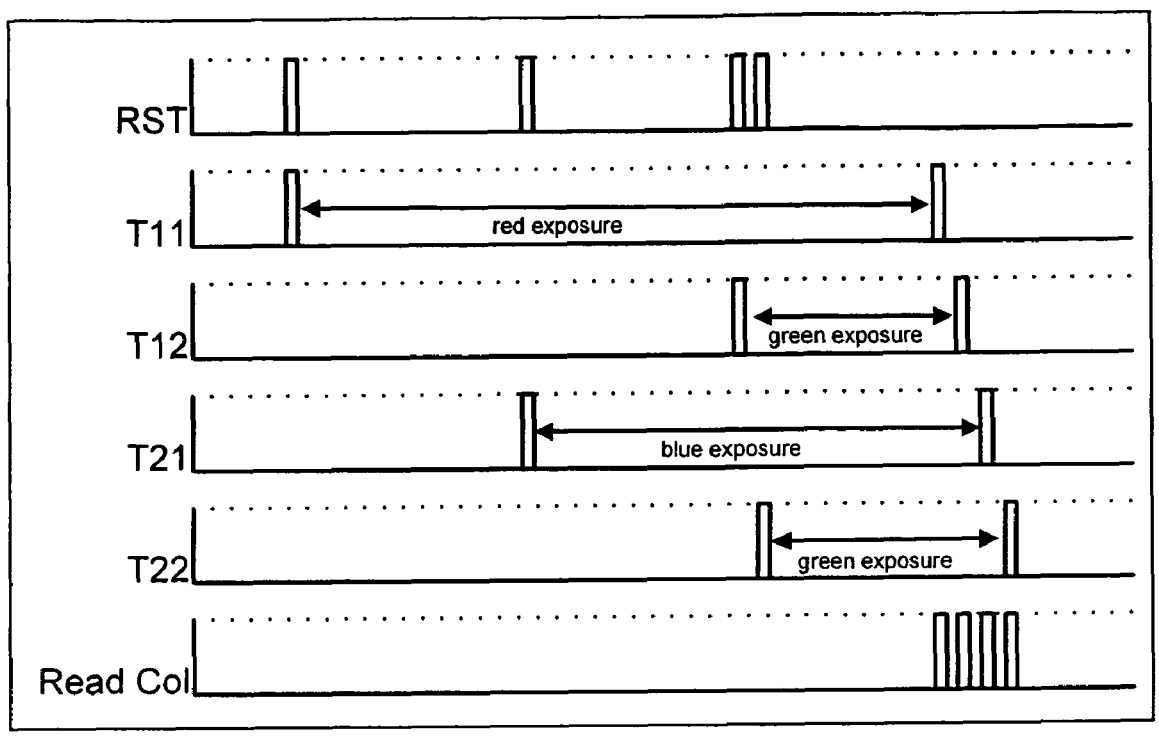
FIG. 13 illustrates timing waveforms for the pixel array of FIG. 12.
Figure 14:
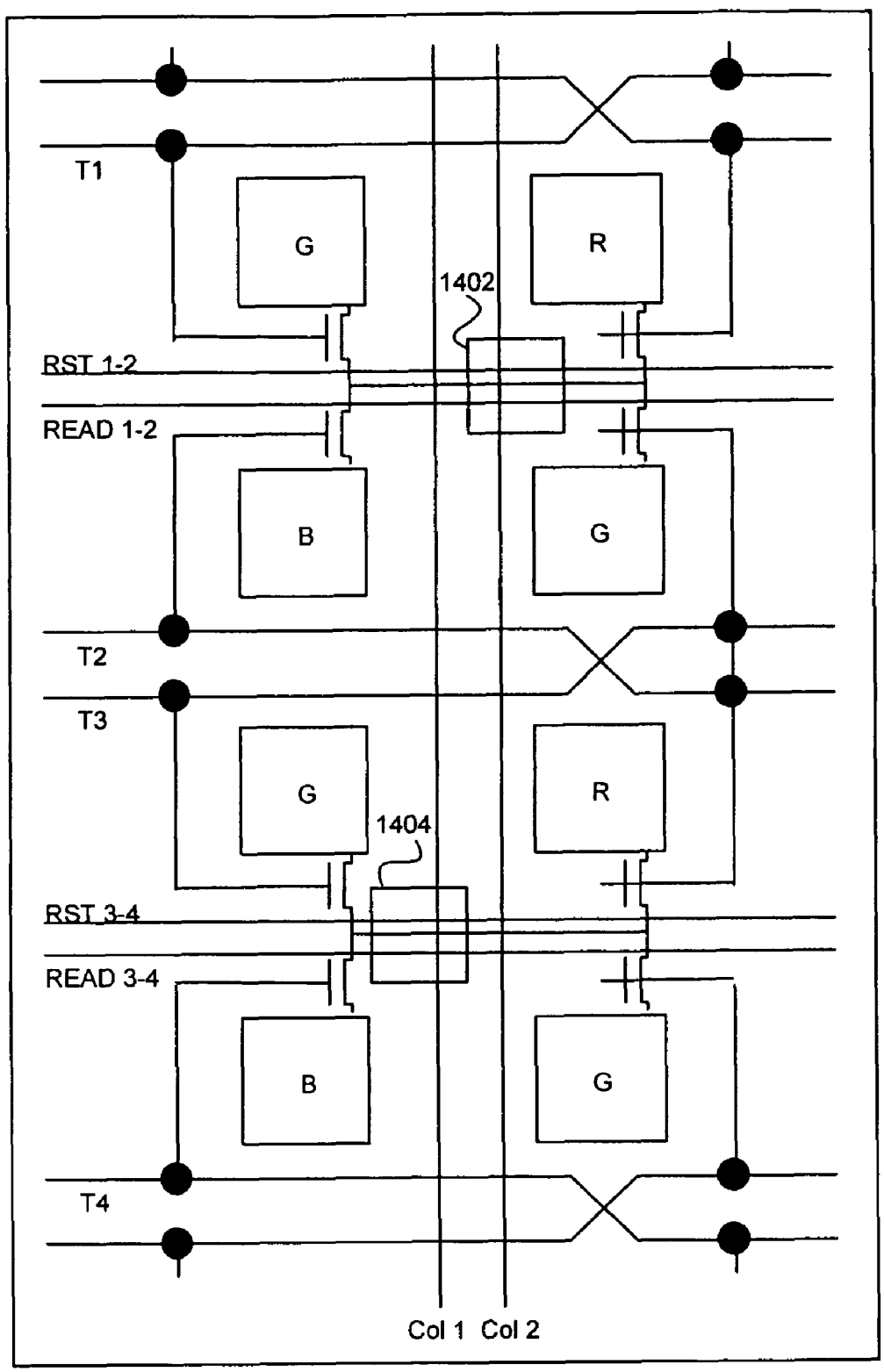
FIG. 14 illustrates an exemplary 2×4 pixel array having sharing of pixels and transfer lines according to embodiments of the invention.

4-T Active Pixel Sensor with Shared Transistors Between Four Pixels and Shared Transfer Lines Between Two Rows The circuit embodiments of FIGS. 10 and 12 use two transfer lines for each row since each row has two color components. The large number of horizontal control lines may undesirably enlarge the area of the pixels. FIG. 14 depicts a 4×2 portion of a 4-T CIS pixel array having transistors shared by four adjacent pixels and having only one transfer line per row (T1, T2, T3, T4). The areas 1402, 1404 denote the common parts of the respective four-pixel groups and include a source follower transistor, a read transistor, and a reset transistor, which are not shown for simplicity sake.

Figure 15:
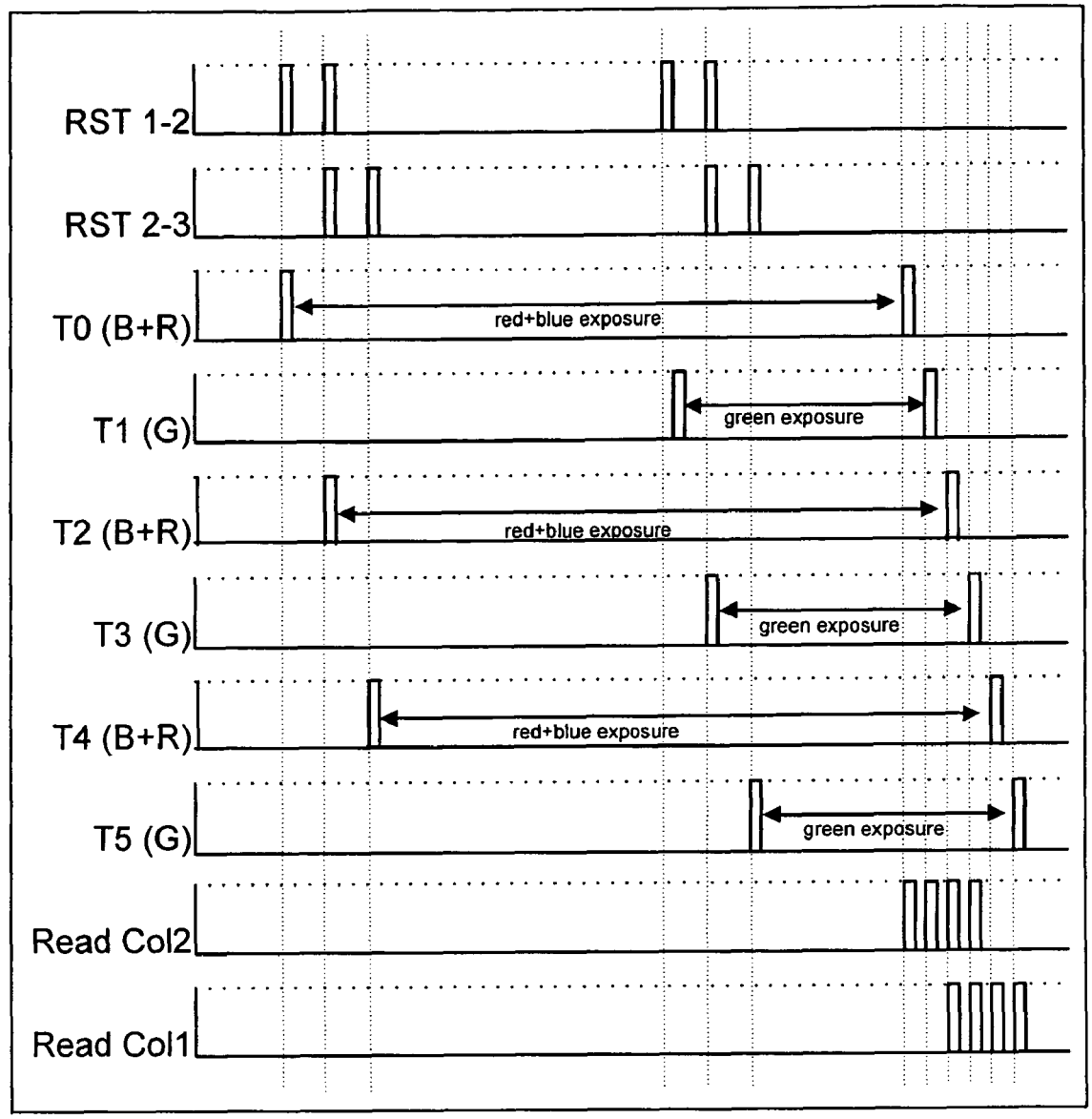
FIG. 15 illustrates timing waveforms for the pixel array of FIG. 14.

As is apparent, each pixel row uses a single horizontal transfer control line (T1, T2, T3, T4), which it shares with a neighbor row. The transfer lines are arranged, however, so that the green pixels for neighboring rows are all controlled by the same transfer line (T1, T3). The red and blue pixels on neighboring rows are then controlled by the other transfer line (T2, T4). This reduces the number of horizontal controls lines by 50% while still allowing some improvement in SNR with respect to conventional techniques. That is because the embodiments of FIG. 14 facilitates a different exposure time setting for the Green pixels on one hand and for the Red and Blue pixels on the other. FIG. 15 depicts the timing waveform for the embodiment of FIG. 14. Other groupings (e.g., Green and Blue pixels having one exposure time setting and Red pixels having a different exposure time setting; Green and Red pixels having one exposure time setting and the Blue pixels having a different exposure time setting) may be used.

As can be see with reference to FIG. 15, the Red and Blue pixels get the same exposure time, which is longer than that of the Green pixels. This allows the exposure duration to be optimized for the green pixels and either the red or blue pixels for the image. This improves the image quality over conventional systems without requiring an increase in the number of horizontal control lines as with embodiments that allow each color's exposure duration to be determined independently. A corresponding energy profile for this embodiment is depicted in FIG. 16.

Figure 16:
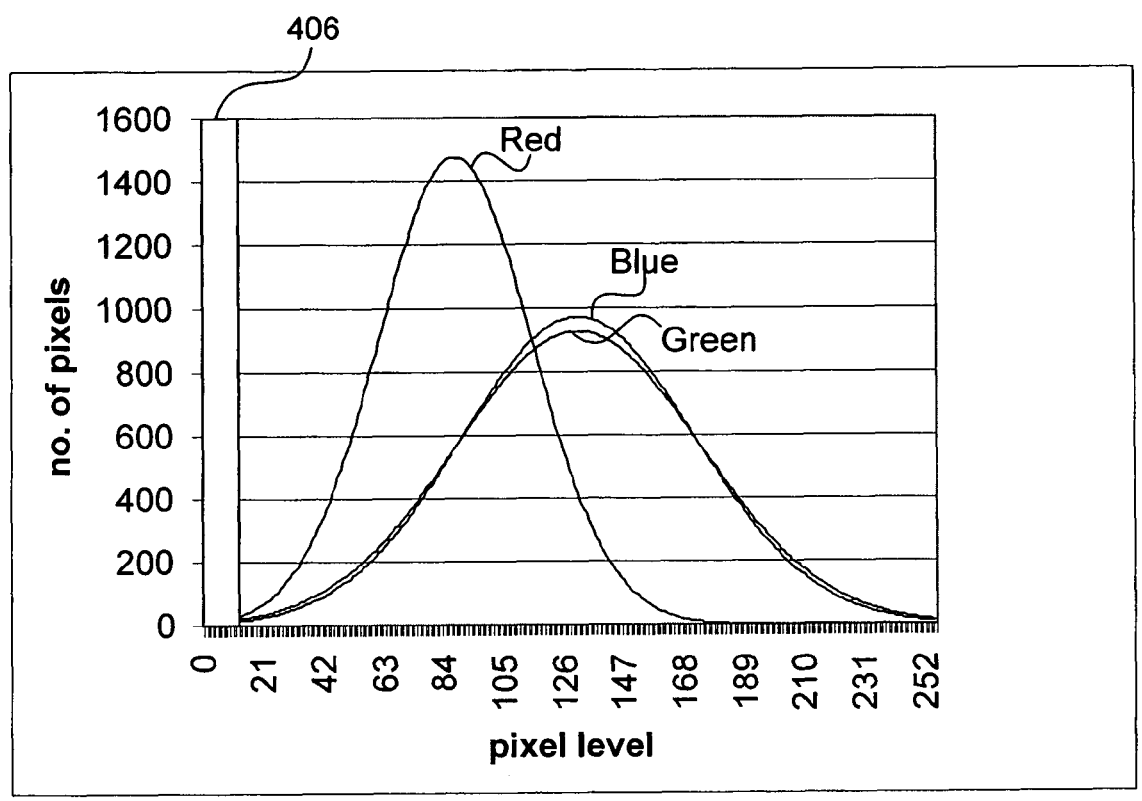
FIG. 16 illustrates an energy profile for an image captured by an image capture device using the pixel array of FIG. 14.

As can be seen with reference to FIG. 16, if this were the same captured image whose energy profile is depicted in FIG. 4, it is apparent that the Red/Blue exposure time has been optimized for the Blue pixels by increasing the Red/Blue exposure time so as to approach saturation. Hence, the SNR for Green and Blue is 22.3 dB and the SNR for Red is 20*log (40*130/60)=18.8 dB.

Having described several embodiments, it will be recognized by those of skill in the art that various modifications, alternative constructions, and equivalents may be used without departing from the spirit of the invention. For example, although the above embodiments are explained in relation to CMOS imagers, the principals could be extended to CCD or other types of imagers. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A method of capturing an image of a scene using an image capture device having an array of pixels, wherein the array of pixels includes pixels of different colors, the method comprising:
for a first duration, capturing the scene with a first plurality of the pixels of a first color; and
for a second duration, capturing the scene with a second plurality of the pixels of a second color;
wherein the first plurality of pixels and second plurality of pixels are different pixels, the first plurality of pixels are associated with only the first color, the second plurality of pixels are associated with only the second color, the first and second durations are different, the first and second durations are chosen, at least in part, to improve the signal to noise ratio of the image capture device, and the first and second durations are chosen separately for the first plurality of pixels and the second plurality of pixels, respectively, according to respective colors of the first and second pluralities of pixels, and
wherein capturing the scene for the first duration includes sending a first reset pulse to a first reset transistor and concurrently sending a first transfer pulse to a first transfer transistor, capturing the scene for the second duration includes sending a second reset pulse to the first reset transistor and concurrently sending a second transfer pulse to a second transfer transistor, timing of the first reset and transfer pulses are different from timing of the second reset and transfer pulses, timing of the first reset and transfer pulses correspond to the first color, and timing of the second reset and transfer pulses correspond to the second color, the first reset transistor being shared by at least two adjacent pixels from among the array of pixels, the first and second transfer transistor each corresponding to a different one of the at least two adjacent pixels, the at least two adjacent pixels including both a pixel from among the first plurality of pixels of the first color and a pixel from among the second plurality of pixels of the second color.

2. The method of claim 1, further comprising:
for a third duration, capturing a third portion of the scene with a third plurality of the pixels of a third color, the third duration being chosen for the third plurality of pixels according to a color of the third plurality of pixels,
wherein the capturing a third portion of the scene the scene includes sending a third reset pulse to a second reset transistor and concurrently sending the second transfer pulse to a third transfer transistor in addition to the second transfer transistor such that the second reset pulse, the third reset pulse and the second transfer pulse are all sent concurrently, the third transfer transistor corresponding to a pixel from among the third plurality of pixels of the third color, the third duration being the same as the second duration.

3. The method of claim 2, wherein the first, second, and third colors include red, green, and blue.

4. The method of claim 2, wherein the first, second, and third durations are different.

5. The method of claim 2, wherein the array of pixels are arranged as a Bayer grid.

6. The method of claim 2, wherein the image capture device includes a CMOS image sensor.

7. The method of claim 1, wherein the first duration is defined as beginning when a reset signal received by the first plurality of pixels changes state and ending when data representing the captured image is read from the first plurality of pixels, and
the second duration is defined as beginning when a reset signal received by the second plurality of pixels changes state and ending when data representing the captured image is read from the first plurality of pixels.

8. An image capture device, comprising:
an array of pixels having pixels of different colors;
a plurality of transfer transistors each corresponding to a pixel from among the array of pixels;
a plurality of reset transistors each shared by at least two adjacent pixels from among the array of pixels; and
circuitry configured to control the operation of the pixels to thereby capture an image of a scene by
capturing the scene with a first plurality of the pixels of a first color for a first duration; and
capturing the scene with a second plurality of the pixels of a second color for a second duration;
wherein the first plurality of pixels and second plurality of pixels are different pixels, the first plurality of pixels are associated with only the first color, the second plurality of pixels are associated with only the second color, the first and second durations are different, and the first and second durations are chosen separately for the first plurality of pixels and the second plurality of pixels, respectively, according to respective colors of the first and second pluralities of pixels, and wherein the circuitry is further configured to control the operation of the pixels to thereby capture the image of the scene by concurrently sending a first reset pulse to a first reset transistor and a first transfer pulse to a first transfer transistor, and concurrently sending a second reset pulse to the first reset transistor and a second transfer pulse to a second transfer transistor, timing of the first reset and transfer pulses being different from timing of the second reset and transfer pulses timing of the first reset and transfer pulses corresponding to the first color, timing of the second transfer and reset pulses corresponding to the second color, the first reset transistor being shared by at least two adjacent pixels from among the pixel array, the first and second transfer transistors each corresponding to a different one of the at least two adjacent pixels, the at least two adjacent pixels including both a pixel from among the first plurality of pixels of the first color and a pixel from among the second plurality of pixels of the second color.

9. The image capture device of claim 8, wherein the circuitry is further configured to control the operation of the pixels to capture an image of a scene by capturing the scene with a third plurality of the pixels of a third color for a third duration, the third duration being chosen for the third plurality of pixels according to a color of the third plurality of pixels, wherein capturing the scene for the third duration includes sending a third reset pulse to a second reset transistor and concurrently sending the second transfer pulse to a third transfer transistor in addition to the second transfer transistor such that the second reset pulse, the third reset pulse and the second transfer pulse are all sent concurrently, the third transfer transistor corresponding to a pixel from among the third plurality of pixels of the third color, the third duration being the same as the second duration.

10. The image capture device of claim 9, wherein the first, second, and third colors include red, green, and blue.

11. The image capture device of claim 9, wherein the first, second, and third durations are different.

12. The image capture device of claim 9, wherein the array of pixels are arranged as a Bayer grid.

13. The image capture device of claim 9, wherein the image capture device includes a CMOS image sensor.

14. The image capture device of claim 9, wherein the first, second, and third durations are chosen, at least in part, to improve the signal to noise ratio of the image capture device.

15. An image capture device, comprising:
an array of pixels having pixels of different colors;
a plurality of transfer transistors each corresponding to a pixel from among the array of pixels;
a plurality of reset transistors each shared by at least two adjacent pixels from among the array of pixels; and
circuitry configured to control the operation of the pixels to thereby capture an image of a scene, wherein the circuitry includes
means for capturing the scene for a first duration with a first plurality of the pixels of a first color;
means for capturing the scene for a second duration with a second plurality of the pixels of a second color;
means for capturing the scene for a third duration with a third plurality of the pixels of a third color;
wherein the first plurality of pixels and second plurality of pixels are different pixels, the first plurality of pixels are associated with only the first color, the second plurality of pixels are associated with only the second color, the first and second durations are different, and the first and second durations are chosen separately for the first plurality of pixels and the second plurality of pixels, respectively, according to respective colors of the first and second pluralities of pixels, and
wherein the means for capturing the scene for a first duration is further configured to send a first reset pulse to a first reset transistor and a first transfer pulse to a first transfer transistor, concurrently, and the means for capturing the scene for a second duration is further configured to send second reset pulse to the first reset transistor and a second transfer pulse to a second transfer transistor, concurrently, liming of the first transfer and reset pulses being different from timing of the second transfer and reset pulses, timing of the first reset and transfer pulses corresponding to the first color, timing of the second reset and transfer pulses corresponding to the second color, the first reset transistor being shared by at least two adjacent pixels from among the pixel array, the first and second transfer transistors each corresponding to a different one of the at least two adjacent pixels, the at least two adjacent pixels including both a pixel from among the first plurality of pixels of the first color and a pixel from among the second plurality of pixels of the second color.

16. The image capture device of claim 15, wherein the first, second, and third colors include red, green, and blue.

17. The image capture device of claim 15, wherein the first, second, and third durations are different.

18. The image capture device of claim 15, wherein the array of pixels are arranged as a Bayer grid.

19. The image capture device of claim 15, wherein the image capture device includes a CMOS image sensor.

20. The image capture device of claim 15, wherein the means for capturing the scene for the third duration is further configured to send a third reset pulse to a second reset transistor and concurrently send the second transfer pulse to a third transfer transistor in addition to the second transfer transistor such that the second reset pulse, the third reset pulse and the second transfer pulse are all sent concurrently, the third transfer transistor corresponding to a pixel from among the third plurality of pixels of the third color, the third duration being the same as the second duration.

* * * * *